(12) United States Patent
Schneider et al.

(10) Patent No.: US 10,164,313 B2
(45) Date of Patent: Dec. 25, 2018

(54) COAXIAL DIPLEXER AND SIGNAL COUPLING DEVICE

(71) Applicant: Airbus DS GmbH, Taufkirchen (DE)

(72) Inventors: Michael Schneider, Neubiberg (DE); Michael Kilian, Zorneding (DE)

(73) Assignee: AIRBUS DS GMBH, Taufkirchen (DE)

( * ) Notice: Subject to any disclaimer, the term of this patent is extended or adjusted under 35 U.S.C. 154(b) by 90 days.

(21) Appl. No.: 15/279,675

(22) Filed: Sep. 29, 2016

(65) Prior Publication Data
US 2017/0093008 A1    Mar. 30, 2017

(30) Foreign Application Priority Data

Sep. 30, 2015  (DE) .................. 10 2015 218 877

(51) Int. Cl.
| | |
|---|---|
| H01P 5/16 | (2006.01) |
| H04B 3/52 | (2006.01) |
| H01P 1/161 | (2006.01) |
| H01P 1/213 | (2006.01) |
| H01P 3/123 | (2006.01) |

(52) U.S. Cl.
CPC ............ *H01P 3/123* (2013.01); *H01P 1/2133* (2013.01); *H01P 1/2138* (2013.01); *H01P 5/16* (2013.01); *H01P 1/161* (2013.01); *H04B 3/52* (2013.01)

(58) Field of Classification Search
CPC ...... H01P 3/123; H01P 1/2133; H01P 1/2138; H01P 5/16; H01P 1/161; H04B 3/52
USPC .......................................... 333/135
See application file for complete search history.

(56) References Cited

U.S. PATENT DOCUMENTS

| | | |
|---|---|---|
| 3,922,621 A | 11/1975 | Gruner |
| 8,878,629 B2 | 11/2014 | Gehring et al. |
| 2011/0254640 A1 | 10/2011 | Gehring et al. |

FOREIGN PATENT DOCUMENTS

DE       102010010299        9/2011

OTHER PUBLICATIONS

Canadian Office Action, dated Jul. 12, 2017, priority document.
(Continued)

*Primary Examiner* — Robert J Pascal
*Assistant Examiner* — Kimberly E Glenn
(74) *Attorney, Agent, or Firm* — Greer, Burns & Cran, Ltd.

(57) ABSTRACT

A signal coupling device associating a first frequency band signal and a second, different frequency band, signal in a common waveguide and distributing the signals to two separate waveguides. The device comprises first and second circular waveguides. The second waveguide is coaxially arranged inside a cylindrical interior of the first waveguide. The first waveguide comprises inwardly projecting inner circumference projections in a region occupied only by the first waveguide. The projections activate higher modes from a fundamental mode. The first and second waveguides and the projections cause the superposition of the fundamental and higher modes to produce a wave front having field components in the first frequency band only in a cylindrical ring region between the second waveguide outer circumference and the first waveguide inner circumference, and having field components in the second frequency band only in a cylindrical interior of the second waveguide.

10 Claims, 5 Drawing Sheets

(56) References Cited

OTHER PUBLICATIONS

James et al., "A dual-band feed system", Eighth International Conference on Antennas and Propagation 1993, ISBN 0-85296-572-9, p. 784-787, Apr. 2, 1983 (Apr. 2, 1983).
German Search Report, dated May 30, 2016, priority document.
"Selected modes" by Spinningspark at Wikipedia.

COAXIAL DIPLEXER AND SIGNAL COUPLING DEVICE

CROSS-REFERENCES TO RELATED APPLICATIONS

This application claims the benefit of the German patent application No. 10 2015 218 877.9 filed on Sep. 30, 2016, the entire disclosures of which are incorporated herein by way of reference.

FIELD OF THE INVENTION

The present invention relates to a coaxial diplexer and signal coupling device, in particular, for use in high frequency technology.

BACKGROUND OF THE INVENTION

Figure 1:
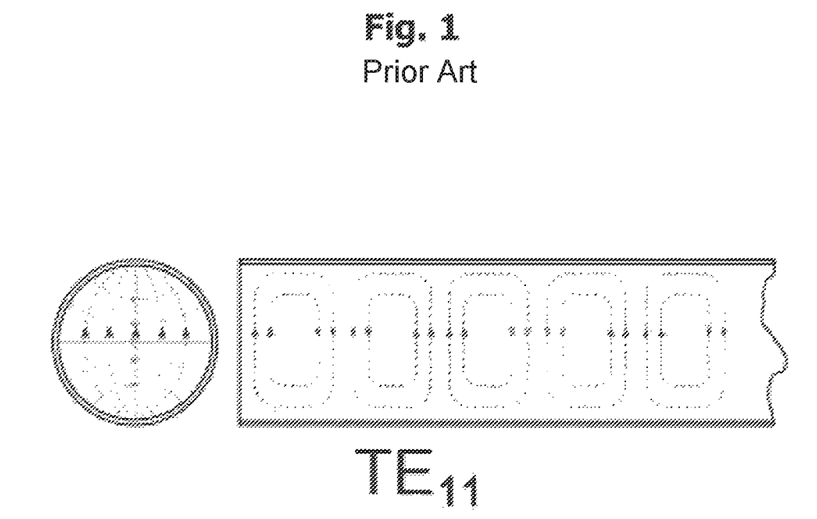
FIG. 1 shows the TE11 mode as a typical parameter of the circular waveguide.

According to the principle, a coaxial diplexer is based on a circular waveguide, which is known in the art. FIG. 1 is an extract from "Selected modes" by Spinningspark at Wikipedia™ and shows as a typical parameter of the circular waveguide the Transverse Electric (TE) mode 11, in short TE11 mode, wherein the dashed lines show the magnetic field in the cross section of the circular waveguide and the solid lines show the electric field in the cross section of the circular waveguide.

In principle, coaxial diplexers target an association of a first signal in a first, e.g., higher frequency band and a second signal in a second, e.g., lower frequency band in one common waveguide, wherein the first frequency band is different from the second frequency band. The reverse effect is also possible, i.e., a distribution of the first and second signal to two separate waveguides. Coaxial diplexers are accordingly to be assigned to the multiplexers, wherein in this case, two signals in two frequency bands are transmitted respectively via an inner and outer circular waveguide.

In this context the U.S. Pat. No. 3,922,621 B (the "Gruner" patent) discloses a coaxial diplexer, which uses corrugations in a cylinder-ring-shaped convexity, wherein the corrugations are designed as so-called TM11 resonators, in order to activate higher modes. The configuration of the corrugations as corresponding resonators for separating the first and second signal is realized by a corresponding geometry of the corrugations by reciprocal corrugation spacing and corrugation depth.

SUMMARY OF THE INVENTION

The present invention strives for an improved coaxial diplexer and a corresponding signal coupling device. As will become clear below, the coaxial diplexer and the signal coupling device are advantageous in particular to the extent that—by replacing the resonators by nubs—they are robust in relation to manufacturing tolerances and realize a high bandwidth. Moreover, the elimination of a corrugated structure leads to a smaller outer diameter of the overall structure.

In a first aspect, a signal coupling device is provided for associating a first signal in a first frequency band and a second signal in a second frequency band in one common waveguide and for distributing the first and second signals to two separate waveguides, wherein the first frequency band is different from the second frequency band. The signal coupling device comprises a first circular waveguide with a constant internal diameter and cylindrical interior, and a second circular waveguide, which is arranged inside the cylindrical interior of the first circular waveguide coaxially to the first circular waveguide in such a way that a first region exists, in which the first and the second circular waveguide are present jointly coaxially, and a second region exists, in which only the first circular waveguide is present, wherein the first circular waveguide comprises a plurality of projections, which is arranged on the inner circumference of the first circular waveguide in the second region, projects radially inwards from the inner circumference of the first circular waveguide, and activates higher modes from a fundamental mode, and the first circular waveguide, the second circular waveguide and the plurality of projections are designed in such a way that the superposition of the fundamental mode and the higher modes produces a wave front, which i) has field components in the first frequency band only in a region of a cylindrical ring between the outer circumference of the second circular waveguide and the inner circumference of the first circular waveguide and ii) has field components in the second frequency band only in a cylindrical interior of the second circular waveguide.

The first frequency band can be a lower or higher frequency band. The second frequency band can accordingly be a higher or lower frequency band.

In a first configuration of the first aspect, each of the plurality of projections is preferably formed by a nub. In this case the form of the nub is preferably defined by at least one element of a group which comprises cuboid or cube form, cylinder form, hemisphere form, hemiellipsoid form, prism form, cone form or truncated cone form, pyramid form or truncated pyramid form or a combination of these geometries. Furthermore, the dimensions of the nubs are preferably identical; as an alternative, the dimensions of at least one of the nubs are preferably different from the dimensions of the remaining nubs. In addition, the plurality of nubs is preferably arranged on at least one imaginary ring along the inner circumference of the first circular waveguide, wherein the at least one imaginary ring lies in a plane which is perpendicular to a common longitudinal axis of the first and second circular waveguide.

In a second configuration of the first aspect, the second circular waveguide is preferably a coaxial conductor.

In a third configuration of the first aspect, the first region preferably defines the first and the second circular waveguide as part of the two separate waveguides. In addition or as an alternative, the second region preferably defines the first circular waveguide as part of the common waveguide.

In a fourth configuration of the first aspect, the fundamental mode is preferably a TE11 fundamental mode. Alternatively or in addition, the higher modes are preferably the TM11 mode.

In a second aspect, a coaxial diplexer is provided that comprises a signal coupling device according to the first aspect, a first transition between the two separate waveguides and the first region and a second transition between the common waveguide and the second region.

BRIEF DESCRIPTION OF THE DRAWINGS

The enclosed drawings show exemplary embodiments of the invention, to which the present invention is in no way to be restricted, however. In the drawings, identical reference signs designate the same or similar formative elements. It should be pointed out that the representation of individual formative elements does not exclude the possibility that the respective underlying functionality can be for implementation in several elements.

DETAILED DESCRIPTION OF THE PREFERRED EMBODIMENTS

In the description below, for the purpose of explanation but not of restriction, specific details are described in order to guarantee a fundamental understanding of the technology presented here. It is evident to the average skilled person that the present technology can be realized in other practical examples that deviate from these specific details.

Figure 2A:
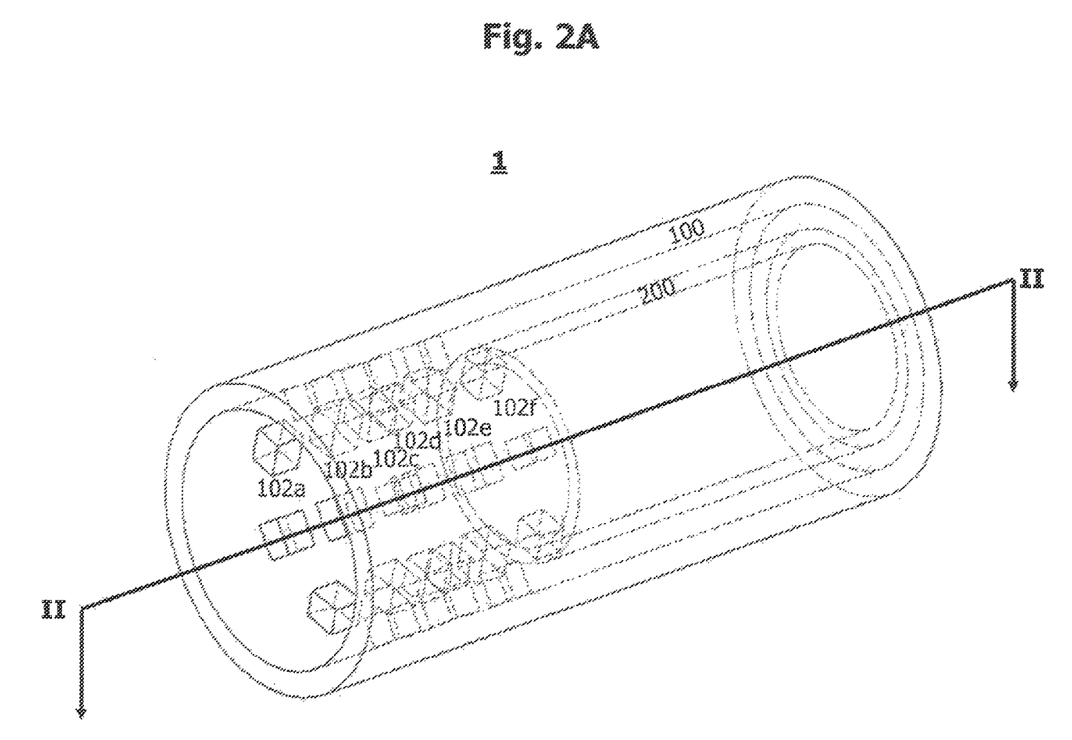
FIG. 2A shows a view in perspective of a signal coupling device and a coaxial diplexer according to a first exemplary embodiment of the invention.
Figure 2B:
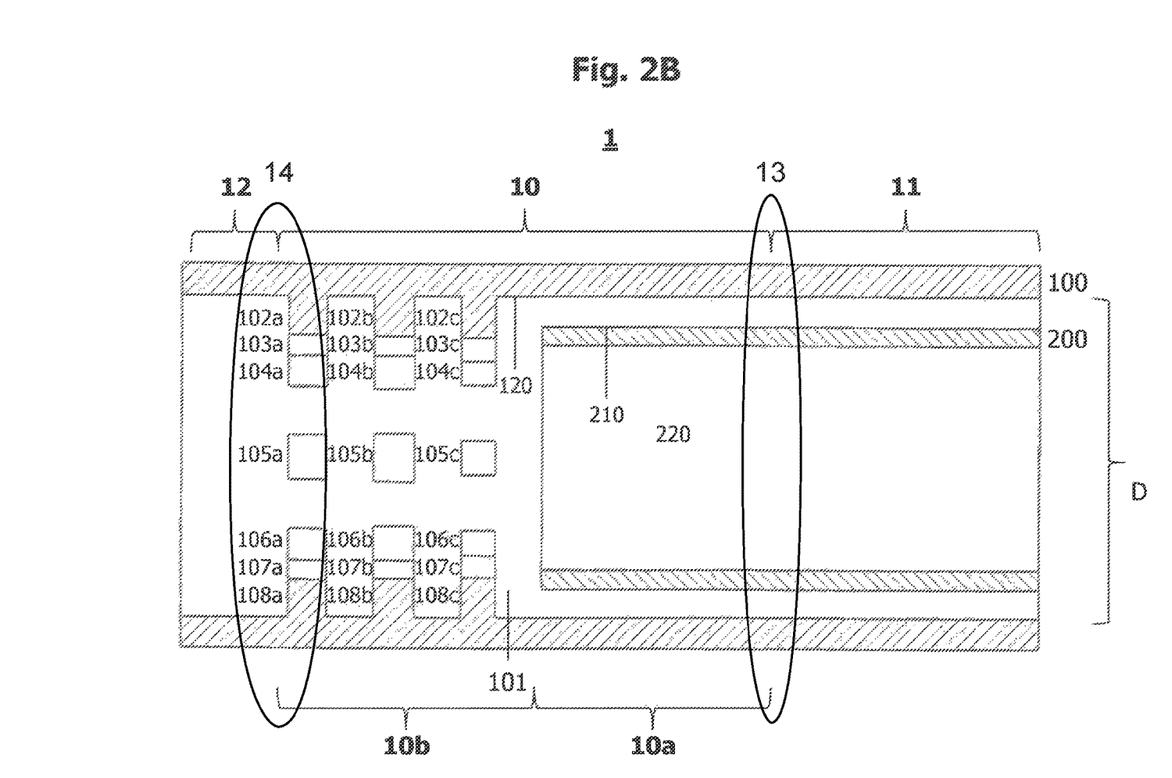
FIG. 2B shows an elevation view of the signal coupling device and the coaxial diplexer on the plane II-II in FIG. 2A, wherein the plane contains the longitudinal axis of the overall system.

FIG. 2A shows a view in perspective of a signal coupling device and a coaxial diplexer according to a first exemplary embodiment of the invention, and FIG. 2B shows an elevation view of the signal coupling device and the coaxial diplexer on the plane II-II in FIG. 2A, wherein the plane contains the longitudinal axis of the overall system.

As is shown in FIGS. 2A and 2B, a coaxial diplexer 1 comprises a signal coupling device 10, (a section of) two separate waveguides 11 and a (section of a) common waveguide 12. The signal coupling device 10 in turn comprises a first region 10a, in which a first circular waveguide 100 and a second circular waveguide 200 are present jointly coaxially, and a second region 10b, in which only the first circular waveguide 100 is present.

The first circular waveguide 100 has a constant internal diameter D and a cylindrical interior 101. The second circular waveguide 200 is located inside the cylindrical interior of the first circular waveguide in such a way that it is arranged coaxially to the first circular waveguide 100. Although this is not shown explicitly in the figures, a dielectric can also be present between the first circular waveguide 100 and the second circular waveguide 200, the dielectric constant of which can be 1 (air) or can be different from 1.

In this context the first circular waveguide 100 comprises a plurality of projections 102a to 108a, 102b to 108b and 102c to 108c. The projections are arranged on the inner circumference 120 of the first circular waveguide 100 in the second region 10b, project radially inwards from the inner circumference 120 of the first circular waveguide 100, and in operation activate higher modes from a fundamental mode. In the illustration of the figures shown, the projections or nubs are arranged in imaginary 3 rings a, b and c, wherein at least one imaginary ring is arranged along the inner circumference 120 of the first circular waveguide 100 and wherein the at least one imaginary ring lies in a plane that is perpendicular to a common longitudinal axis of the first and second circular waveguide 100, 200. However, the invention is not limited to this, more or fewer imaginary rings can be used for the arrangement. Moreover, the figures show the projections/nubs 102 to 108 lying at equal reciprocal distances along the imaginary rings and on axes that run parallel to the longitudinal axis of the coaxial diplexer; this neither excludes that the reciprocal distances along the imaginary rings are not equal, nor that the projections are reciprocally offset from ring to ring. An arrangement of the projections along an imaginary helical line or on inclined planes also comes into question.

The arrangement of the projections/nubs 102 to 108 is only limited in respect of its suitability, that the first circular waveguide, the second circular waveguide and the plurality of projections are designed in such a way that the superposition of the fundamental mode and the higher modes produces a wave front which i) has field components in the first frequency band only in a region of a cylindrical ring between the outer circumference 210 of the second circular waveguide 200 and the inner circumference 120 of the first circular waveguide 100 and ii) has field components in the second frequency band only in a cylindrical interior 220 of the second circular waveguide 200.

This also applies to the form of the projections/nubs, wherein the form of the nub can be defined by at least one element of a group, which comprises cuboid or cube form, cylinder form, hemisphere form, hemiellipsoid form, prism form, cone form or truncated cone form, pyramid form or truncated pyramid form or combinations of these geometries. In this context the dimensions of the nubs can be identical, or the dimensions of at least one of the nubs can be different from the dimensions of the remaining nubs.

Finally, the fundamental mode can be a TE11 fundamental mode, and there can be the higher modes. It should be pointed out that the consideration of the TE11 fundamental mode only constitutes one way of looking at the signal and any other viewpoint can be chosen as long as the two signals in the two different frequency ranges are coupled reliably into the two separate waves respectively or combined suitably in the common waveguide.

As described above, the coaxial diplexer 1 comprises the signal coupling device 10 in one or more of the variants described above. The coaxial diplexer 1 also comprises a first transition 13 between the two separate waveguides 11 and the first region 10a, and a second transition 14 between the common waveguide 12 and the second region 10b. As shown in the figures, one or both of the transitions can be realized by a one-piece configuration of the signal coupling device 10 and the coaxial diplexer 1; however, this does not exclude that one or both of the transitions is/are configured e.g., by a detachable connection, such as a combination of internal thread and external thread or a plug connection between common waveguide 11/the two separate waveguides 12 and the signal coupling device, or by a non-detachable connection, such as a soldered connection.

Figure 3A:
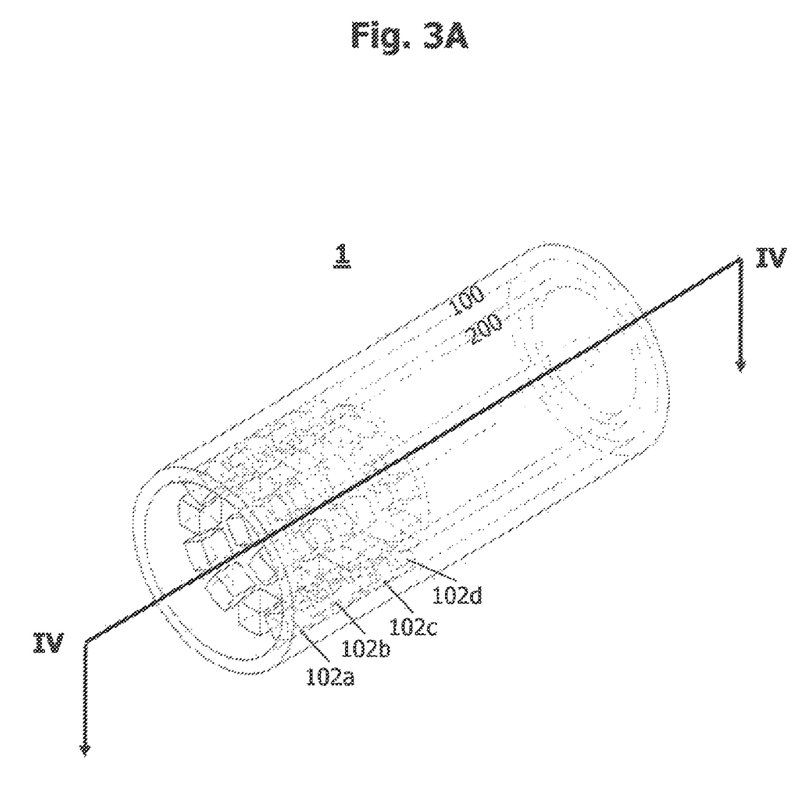
FIG. 3A shows a view in perspective of a signal coupling device and a coaxial diplexer according to a second exemplary embodiment of the invention.
Figure 3B:
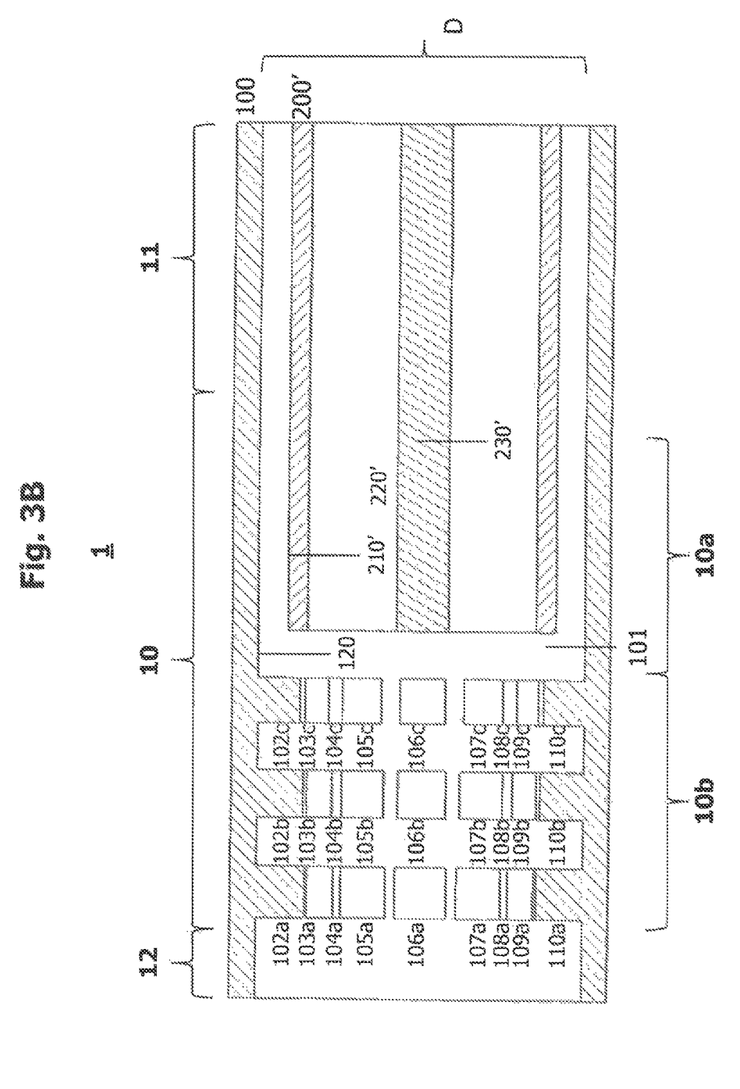
FIG. 3B shows an elevation view of the signal coupling device and the coaxial diplexer on the plane IV-IV in FIG. 3A, wherein the plane contains the longitudinal axis of the overall system.

FIG. 3A shows a view in perspective of a signal coupling device and a coaxial diplexer according to a second exemplary embodiment of the invention, and FIG. 3B shows an elevation view of the signal coupling device and the coaxial diplexer on the plane IV-IV in FIG. 3A, wherein the plane contains the longitudinal axis of the overall system. In the second exemplary embodiment, the same reference signs designate the same elements with regard to the first exemplary embodiment and their description is omitted.

According to the second exemplary embodiment, the circular waveguide 200' is preferably formed as a (separate) coaxial conductor 200', which has an inner conductor 230' and an outer circumference 210'. The signal coupling device 10 also has a greater number of projections 102a to 110a, 102b to 110b and 102c to 110c, without being restricted to this.

Due to the coaxial structure, the limit frequency of the waveguide is reduced as a whole, which is why lower frequencies can pass the system of coaxial conductor 200' and inner conductor 230'.

Without loss of universality the invention can be summarized as follows.

The diplexer has the task of associating the signals in a higher and a lower frequency band in one common waveguide or distributing them to two separate waveguides.

The common waveguide is a circular waveguide. The waveguide for the lower frequency band is a coaxial conductor. The waveguide for the higher frequency band is a circular waveguide, which serves at the same time as an inner conductor of the coaxial conductor for the lower frequency band. Alternatively, the waveguide for the higher frequency band can also be executed as a coaxial conductor.

In the invention, nubs are used instead of resonators. These can be executed as cuboids, cylinders, hemispheres, hemiellipsoids, prisms, cones or truncated cones, pyramids or truncated pyramids or any other geometries. The nubs are arranged in several rings. The number of rings and the number of nubs per ring can be selected/optimized in any way. The dimensions of the individual nubs can be identical or different.

The common waveguide guides the fundamental mode TE11. Higher modes are activated in addition by the nubs. The diplexer including nubs is to be designed so that the superposition of all modes in the lower frequency band produces a wave front, which has field components for the lower (or alternatively for the higher) frequency band only in the region of the coaxial conductor and in the higher (or alternatively for the lower) frequency band has field components only in the region of the circular waveguide.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A signal coupling device for associating a first signal in a first frequency band and a second signal in a second frequency band in a common waveguide and for distributing the first and second signals to two separate waveguides, wherein the first frequency band is different from the second frequency band, comprising:
    a first circular waveguide having a constant internal diameter and a cylindrical interior; and
    a second circular waveguide, arranged inside the cylindrical interior of the first circular waveguide coaxially to the first circular waveguide, in such a way that a first region exists in which the first and the second circular waveguides are present jointly coaxially, and a second region exists in which only the first circular waveguide is present, wherein:
    the first circular waveguide comprises a plurality of projections, wherein each of the projections is formed by a nub, which projections:
        are arranged on the inner circumference of the first circular waveguide in the second region,
        project radially inwards from the inner circumference of the first circular waveguide, and
        activate higher modes from a fundamental mode, and
    the first circular waveguide, the second circular waveguide and the plurality of projections are configured in such a way that a superposition of the fundamental mode and the higher modes produces a wave front, which
        i) has field components in the first frequency band only in a region of a cylindrical ring between the outer circumference of the second circular waveguide and the inner circumference of the first circular waveguide and
        ii) has field components in the second frequency band only in a cylindrical interior of the second circular waveguide.

2. The signal coupling device according to claim 1, wherein the form of the nub is defined by at least one element of a group, which comprises:
    cuboid form or cube form,
    cylinder form,
    hemisphere form,
    hemiellipsoid form,
    prism form,
    cone form or truncated cone form,
    pyramid form or truncated pyramid form, and
    any other geometries or combinations of said geometries.

3. The signal coupling device according to claim 1, wherein the dimensions of the nubs are identical.

4. The signal coupling device according to claim 1, wherein the dimensions of at least one of the nubs are different from the dimensions of the remaining nubs.

5. The signal coupling device according to claim 1, wherein the plurality of nubs are arranged on at least one imaginary ring along the inner circumference of the first circular waveguide, and wherein the at least one imaginary ring lies in a plane that is perpendicular to a common longitudinal axis of the first and second waveguides.

6. The signal coupling device according to claim 1, wherein the second circular waveguide is a coaxial conductor.

7. The signal coupling device according to claim 1, wherein the first region defines the first and the second circular waveguide as part of the two separate waveguides.

8. The signal coupling device according to claim 1, wherein the second region defines the first circular waveguide as part of the common waveguide.

9. The signal coupling device according to claim 1, wherein:
    the fundamental mode is a TE11 fundamental mode; and/or
    the TM11 mode is the higher mode.

10. A coaxial diplexer, comprising:
    a signal coupling device for associating a first signal in a first frequency band and a second signal in a second frequency band in a common waveguide and for distributing the first and second signals to two separate waveguides, wherein the first frequency band is different from the second frequency band, comprising:
a first circular waveguide having a constant internal diameter and a cylindrical interior; and a second circular waveguide, arranged inside the cylindrical interior of the first circular waveguide coaxially to the first circular waveguide, in such a way that a first region exists in which the first and the second circular waveguides are present jointly coaxially, and a second region exists in which only the first circular waveguide is present, wherein:

the first circular waveguide comprises a plurality of projections, wherein each of the projections is formed by a nub, which projections:
- are arranged on the inner circumference of the first circular waveguide in the second region,
- project radially inwards from the inner circumference of the first circular waveguide, and
- activate higher modes from a fundamental mode, and the first circular waveguide, the second circular waveguide and the plurality of projections are configured in such a way that a superposition of the fundamental mode and the higher modes produces a wave front, which
- i) has field components in the first frequency band only in a region of a cylindrical ring between the outer circumference of the second circular waveguide and the inner circumference of the first circular waveguide and
- ii) has field components in the second frequency band only in a cylindrical interior of the second circular waveguide, a first transition between the two separate waveguides and the first region, and a second transition between the common waveguide and the second region.

* * * * *